United States Patent
Ni

(10) Patent No.: US 12,459,085 B2
(45) Date of Patent: Nov. 4, 2025

(54) IMPACT TOOL AND CONTROL METHOD

(71) Applicant: Nanjing Chervon Industry Co., Ltd., Nanjing (CN)

(72) Inventor: Lianghua Ni, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 42 days.

(21) Appl. No.: 18/446,982

(22) Filed: Aug. 9, 2023

(65) Prior Publication Data

US 2024/0051095 A1 Feb. 15, 2024

(30) Foreign Application Priority Data

Aug. 12, 2022 (CN) .......................... 202210969520.8

(51) Int. Cl.
| | | |
|---|---|---|
| B25B 21/02 | (2006.01) | |
| B25B 23/147 | (2006.01) | |
| B25F 5/00 | (2006.01) | |
| B25F 5/02 | (2006.01) | |
| H02P 6/15 | (2016.01) | |
| H02P 6/16 | (2016.01) | |
| H02P 6/17 | (2016.01) | |
| H02P 6/28 | (2016.01) | |

(52) U.S. Cl.
CPC .......... B25B 21/02 (2013.01); B25B 23/1475 (2013.01); B25F 5/001 (2013.01); B25F 5/02 (2013.01)

(58) Field of Classification Search
CPC ....... B25B 21/02; B25B 23/1475; H02P 6/15; H02P 6/16; H02P 6/17; H02P 6/28
USPC ........................................... 173/93.5
See application file for complete search history.

(56) References Cited

U.S. PATENT DOCUMENTS

| | | | | |
|---|---|---|---|---|
| 10,594,237 | B2* | 3/2020 | Buckley | .............. H02P 6/17 |
| 10,994,325 | B2* | 5/2021 | Ikuta | .............. F16B 19/08 |
| 11,557,991 | B2* | 1/2023 | Dai | .............. H02P 6/17 |
| 11,926,029 | B2* | 3/2024 | Wolf | .............. B25C 7/00 |
| 2021/0394344 | A1* | 12/2021 | Mueckl | .............. B25B 21/023 |
| 2022/0014128 | A1* | 1/2022 | Dai | .............. B25B 23/1475 |
| 2023/0286118 | A1* | 9/2023 | Kendall | .............. B25B 21/00 |

\* cited by examiner

Primary Examiner — Thanh K Truong
Assistant Examiner — Patrick B Fry
(74) Attorney, Agent, or Firm — Greenberg Traurig, LLP

(57) ABSTRACT

An impact tool includes: an impact mechanism for applying an impact force to an output shaft; and a controller configured to control a motor. The controller is configured to: after the impact mechanism applies the impact force to the output shaft, determine, according to a load parameter of the output shaft in one or more impact cycles, that a fastener is in a fastening state and control the motor to enter a shutdown state. The load parameter of the output shaft includes the number of commutation cycles of the motor and/or a change in the number of commutation cycles of the motor.

17 Claims, 8 Drawing Sheets

After an impact mechanism applies an impact force to an output shaft, acquire a load parameter of the output shaft in one or more impact cycles — S10

Determine, according to the load parameter of the output shaft, that a fastener is in a fastening state — S20

A controller controls a motor to limit torque output so that the output shaft cannot output torque — S30

IMPACT TOOL AND CONTROL METHOD

RELATED APPLICATION INFORMATION

This application claims the benefit under 35 U.S.C. § 119(a) of Chinese Patent Application No. 202210969520.8, filed on Aug. 12, 2022, which application is incorporated herein by reference in its entirety.

BACKGROUND

With the development of science and technology, impact tools gradually replace traditional manual tools and are applied to working conditions such as drilling and mounting fasteners, thereby greatly improving working efficiency.

In a working process, an impact tool uses an electric motor to drive an output shaft to output torque externally such that a fastener is driven to rotate at a high speed to be screwed into target workpieces. Typically, the target workpieces include an iron sheet and a wooden board. In the process where the fastener is screwed into the target workpieces, resistance gradually increases, and an impact mechanism is driven by the electric motor to intermittently provide an impact force for the output shaft so that fastening through impact is completed.

With existing impact tools, a user typically determines, according to a hand feeling, whether the fastening is finished. In addition, when determining that the fastening is finished, the user controls the impact tool to shut down, so as to avoid damage to the fastener and the target workpieces.

SUMMARY

An impact tool includes: a motor including a drive shaft rotating about a first axis; an output shaft for outputting torque externally so that a fastener is operated, where the output shaft rotates with an output axis as a rotation axis; an impact mechanism for applying an impact force to the output shaft; and a controller configured to control the motor. The controller is configured to: after the impact mechanism applies the impact force to the output shaft, determine, according to a load parameter of the output shaft in one or more impact cycles, that the fastener is in a fastening state and control the motor to limit torque output so that the output shaft is incapable of outputting the torque. The load parameter of the output shaft includes the number of commutation cycles of the motor and/or a change in the number of commutation cycles of the motor.

In some examples, the impact tool further includes a detection mechanism configured to detect a running parameter of the motor.

In some examples, the controller determines an impact cycle, the number of commutation cycles of the motor, and the change in the number of commutation cycles of the motor according to the running parameter of the motor.

In some examples, the detection mechanism includes a current detection unit configured to detect a current parameter of the motor.

In some examples, the detection mechanism includes a commutation detection unit configured to perform commutation detection on the motor to obtain the number of times a current of the motor is commutated and/or time during which the current is commutated each time.

In some examples, the controller is configured to determine an impact cycle according to time between peaks of a current of the motor.

In some examples, the controller is configured to determine an impact cycle according to time taken for each commutation of the motor.

In some examples, the controller is configured to: acquire the number of commutation cycles of the motor in a single impact cycle or multiple impact cycles, perform determination based on the number of commutation cycles of the motor and a preset threshold of the number of commutation cycles of the motor to determine that the fastener is in the fastening state, and control the motor to limit the torque output so that the output shaft is incapable of outputting the torque.

In some examples, the controller is configured to: acquire a change in the number of commutation cycles of the motor in two or more adjacent impact cycles, perform determination based on the change in the number of commutation cycles of the motor and a preset threshold of the change in the number of commutation cycles of the motor to determine that the fastener is in the fastening state, and control the motor to limit the torque output so that the output shaft is incapable of outputting the torque.

In some examples, the controller is configured to: acquire the number of commutation cycles of the motor in a single impact cycle and a change in the number of commutation cycles of the motor in two or more adjacent impact cycles, perform determination based on the number of commutation cycles of the motor and a preset threshold of the number of commutation cycles of the motor and perform determination based on the change in the number of commutation cycles of the motor and a preset threshold of the change in the number of commutation cycles of the motor to determine that the fastener is in the fastening state, and control the motor to limit the torque output so that the output shaft is incapable of outputting the torque.

In some examples, the preset threshold of the number of commutation cycles of the motor is greater than or equal to the maximum value of the number of commutation cycles of the motor in the single impact cycle when the output shaft is in a blocked mode.

In some examples, the impact tool further includes an electric brake unit, where when the motor is controlled to enter a shutdown state, the controller is configured to: when it is determined that the fastener is in the fastening state, control the electric brake unit to electrically brake the motor.

In some examples, the impact tool further includes a mechanical brake unit, where when the motor is controlled to enter a shutdown state, the controller is configured to: when it is determined that the fastener is in the fastening state, control the mechanical brake unit to mechanically brake the motor.

In some examples, the controller reduces a rotational speed of the motor after the impact mechanism applies the impact force to the output shaft.

In some examples, the impact tool further includes a direct current (DC) power supply for powering the motor.

An impact tool includes: a motor including a drive shaft rotating about a first axis; an output shaft for outputting torque externally so that a fastener is operated, where the output shaft rotates with an output axis as a rotation axis; an impact mechanism for applying an impact force to the output shaft; and a controller configured to control the motor. The controller is configured to: acquire a running parameter of the motor, determine the number of rotations of the output shaft or a change value of the number of rotations of the output shaft according to the running parameter of the motor in one or more impact cycles, determine that the fastener is in a fastening state, and control the motor to enter a shutdown state.

In some examples, the number of rotations of the output shaft is determined according to the number of commutation times of the motor between peaks of a working current of the motor.

An impact tool control method is used for controlling an impact tool. The impact tool includes: a motor including a drive shaft rotating about a first axis; an output shaft for outputting torque externally so that a fastener is operated, where the output shaft rotates with an output axis as a rotation axis; an impact mechanism for applying an impact force to the output shaft; and a controller configured to control the motor. The impact tool control method includes: after the impact mechanism applies the impact force to the output shaft, acquiring a load parameter of the output shaft in one or more impact cycles, where the load parameter of the output shaft includes the number of commutation cycles of the motor and/or a change in the number of commutation cycles of the motor; and determining, according to the load parameter of the output shaft, that the fastener is in a fastening state, and controlling, by the controller, the motor to limit torque output so that the output shaft is incapable of outputting the torque.

In some examples, the impact tool control method includes: acquiring the number of commutation cycles of the motor in a single impact cycle or multiple impact cycles after the impact mechanism applies the impact force to the output shaft; and determining, according to the number of commutation cycles of the motor, that the fastener is in the fastening state, and controlling, by the controller, the motor to limit the torque output so that the output shaft is incapable of outputting the torque.

In some examples, the impact tool control method includes: acquiring a change in the number of commutation cycles of the motor in two or more adjacent impact cycles after the impact mechanism applies the impact force to the output shaft; and determining, according to the change in the number of commutation cycles of the motor, that the fastener is in the fastening state, and controlling, by the controller, the motor to limit the torque output so that the output shaft is incapable of outputting the torque.

DETAILED DESCRIPTION

In order that solutions in the present application are better understood by those skilled in the art, the technical solutions in examples of the present application are clearly and completely described below in conjunction with drawings in the examples of the present application. Apparently, the described examples are part, not all, of the examples of the present application. Based on the examples of the present application, all other examples obtained by those of ordinary skill in the art without creative work should fall within the scope of the present application.

It is to be noted that the terms "include", "have", and any other variations thereof in the specification and claims of the present application and the preceding drawings mean to cover a non-exclusive inclusion. For example, a process, method, system, product, or apparatus which includes a list of steps or units is not necessarily limited to those expressly listed steps or units, but may include other steps or units not expressly listed or inherent to such a process, method, system, product, or apparatus.

Figure 1:
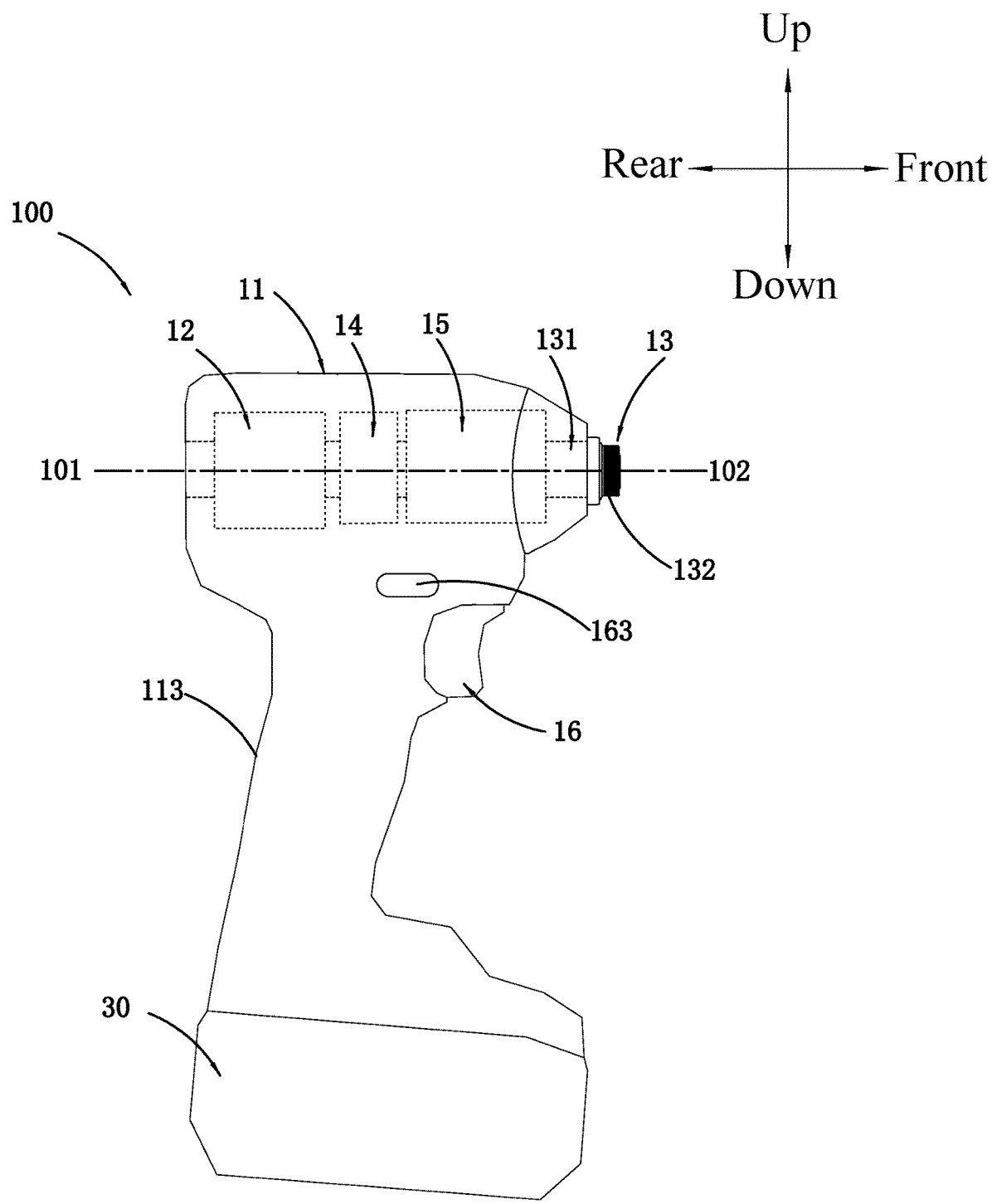
FIG. 1 is a structural view of an impact tool according to an example of the present application.
Figure 2:
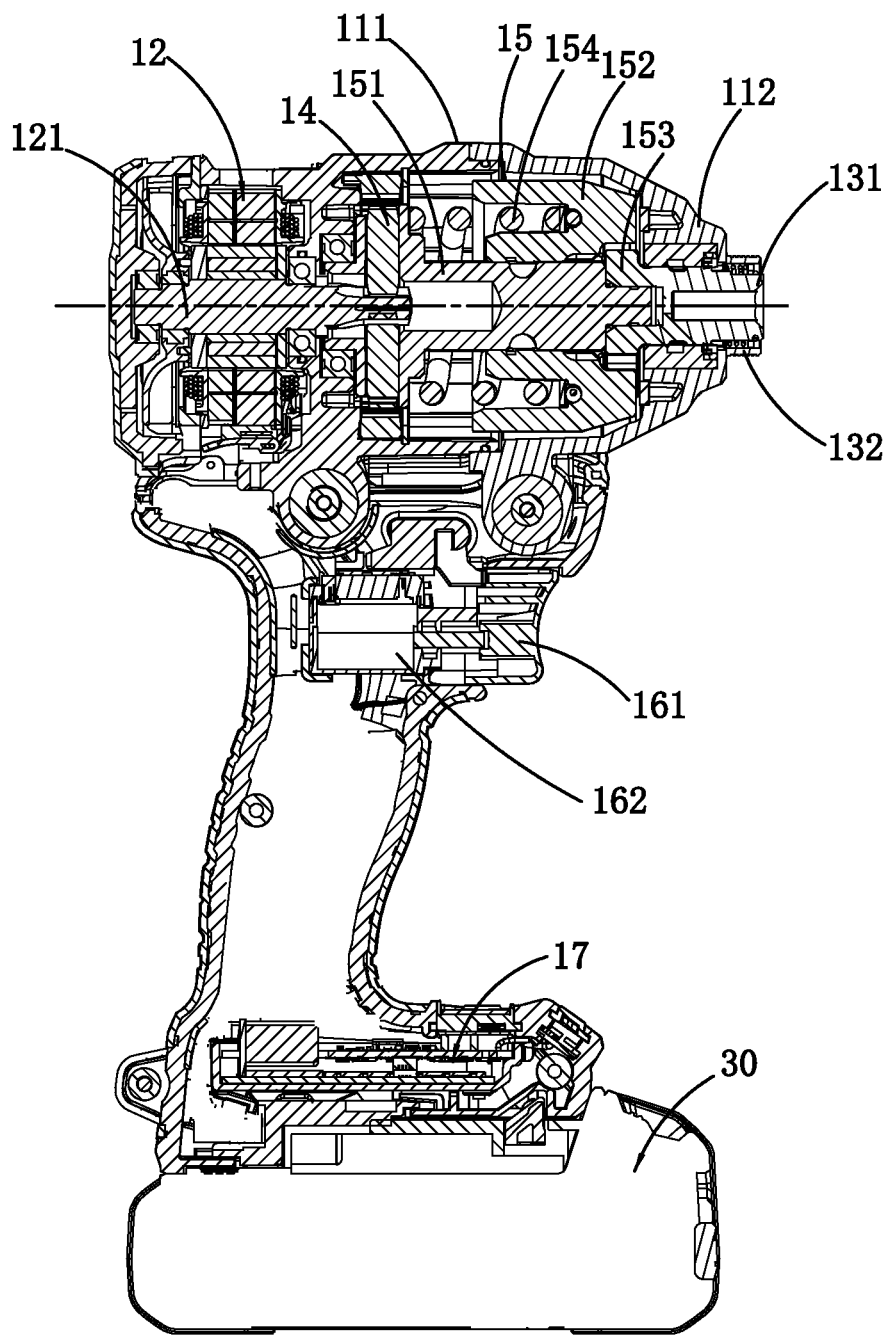
FIG. 2 is a sectional view of the structure of an impact tool according to an example of the present application.

FIGS. 1 and 2 show an impact tool in an example of the present application. The impact tool is an impact screwdriver 100. It is to be understood that in other alternative examples, different work accessories may be mounted to the impact tool. The impact tool with these different working accessories may be, for example, an impact drill or the impact screwdriver.

The impact screwdriver 100 includes a power supply device. In this example, the power supply device is a DC power supply 30. The DC power supply 30 is used for powering the impact screwdriver 100. The DC power supply 30 is a battery pack, and the impact screwdriver 100 is powered by the battery pack cooperating with a corresponding power supply circuit. It is to be understood by those skilled in the art that the power supply device is not limited to the DC power supply, and corresponding components in the tool may be powered through mains or an alternating current (AC) power supply which cooperates with a corresponding rectifier circuit, filter circuit, and voltage regulation circuit.

As shown in FIGS. 1 and 2, the impact screwdriver 100 includes a housing 11, a motor 12, an output mechanism 13, a transmission mechanism 14, and an impact mechanism 15. The motor 12 includes a drive shaft 121 rotating about a first axis 101. In this example, the motor 12 is specifically an electric motor. The electric motor 12 is used below instead of the motor, and an electric motor shaft 121 is used below instead of the drive shaft, which cannot serve as a limitation on the present application.

The output mechanism 13 includes an output shaft 131 for connecting a work accessory and driving the work accessory to rotate. A clamping assembly 132 is disposed at the front end of the output shaft 131 and may clamp corresponding working accessories, such as a bit, a drill bit, and a socket, when different functions are implemented. In this example, the output shaft 131 may drive a fastener through the bit, for example, the fastener may be a screw. The electric motor 12 drives the output shaft 131 to rotate to drive the bit and the fastener to rotate such that the fastener is screwed into or unscrewed from a target workpiece.

The output shaft 131 outputs torque externally so that the fastener is operated, and the output shaft 131 rotates about an output axis, where the output axis is a second axis 102 in this example. In this example, the first axis 101 coincides with the second axis 102. In other alternative examples, a certain included angle exists between the second axis 102 and the first axis 101. In other alternative examples, the first axis 101 and the second axis 102 are parallel to each other but do not coincide with each other.

The impact mechanism 15 is used for applying an impact force to the output shaft 131. The impact mechanism 15 includes a main shaft 151, an impact block 152 sleeved on the periphery of the main shaft 151, a hammer anvil 153 disposed at the front end of the impact block 152, and a resilient element 154. The hammer anvil 153 is connected to the output shaft 131. In this example, the hammer anvil 153 includes an anvil, and the output shaft 131 is formed at the front end of the anvil. It is to be understood that the anvil and the output shaft 131 may be integrally formed or separately formed as independent parts.

The impact block 152 includes an impact block body and a pair of first end teeth which are symmetrically disposed on the front end face of the impact block body in a radial direction and protrude from the front end face of the impact block body. A pair of second end teeth are symmetrically disposed on the rear end surface of the anvil opposite to the impact block in the radial direction and protrude from the rear end surface of the anvil. The impact block 152 is driven by the main shaft 151, and the hammer anvil 153 mates with the impact block 152 and is struck by the impact block 152.

The impact block 152 is supported on the main shaft 151 to rotate integrally with the main shaft 151 and is reciprocally slidable with respect to the main shaft 151 in the axial direction of the main shaft. In this example, the axis of the main shaft coincides with the first axis 101. Therefore, the impact block 152 reciprocally slides and rotates with respect to the main shaft 151 along the direction of the first axis 101. In other alternative examples, the axis of the main shaft may be parallel to the first axis 101 but does not coincide with the first axis 101.

The resilient element 154 provides a force for the impact block 152 to approach the hammer anvil 153. In this example, the resilient element 154 is a coil spring.

The housing 11 includes an electric motor housing 111 for accommodating the electric motor 12 and an output housing 112 for accommodating at least part of an output assembly 13. The output housing 112 is connected to the front end of the electric motor housing 111. The housing 11 is also formed with or connected to a grip 113 for a user to operate. The grip 113 and the electric motor housing 112 form a T-shaped or L-shaped structure, which facilitates the hold and operation of the user. An end of the grip 113 is connected to the DC power supply 30. The electric motor 12, a transmission assembly 14, the impact assembly 15, and the output assembly 13 are sequentially arranged in the electric motor housing 111 and the output housing 112 along a front and rear direction.

The transmission mechanism 14 is disposed between the electric motor 12 and the impact mechanism 15 and used for transmitting power between the electric motor shaft 121 and the main shaft 151. In this example, the transmission mechanism 14 is decelerated by a planet gear. The working principle according to which the deceleration is performed by the planet gear and the deceleration implemented by this transmission mechanism have been completely disclosed to those skilled in the art. Therefore, a detailed description is omitted herein for the brevity of the specification.

Figure 3:
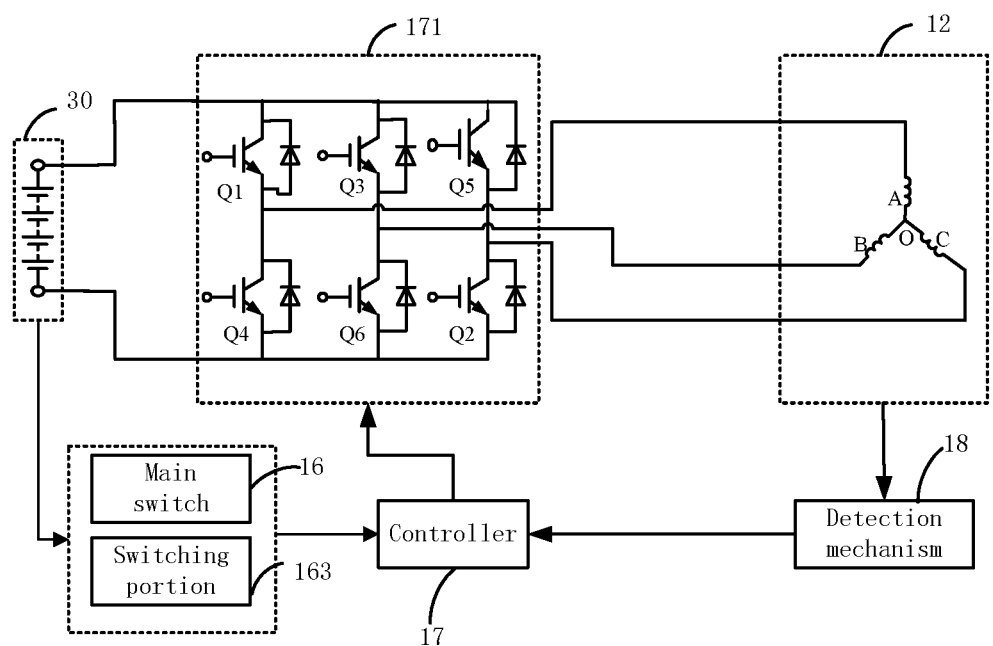
FIG. 3 is a circuit block diagram of an impact tool according to an example of the present application.

As shown in FIGS. 1 to 3, the electric motor 12 includes stator windings and a rotor. In some examples, the electric motor 12 is a three-phase brushless motor including the rotor with a permanent magnet and three phases of stator windings A, B, and C electronically commutated. In some examples, a star connection is adopted between the three phases of stator windings A, B, and C. In other examples, a delta connection is adopted between the three phases of stator windings A, B, and C. However, it is to be understood that other types of brushless motors are also within the scope of the present disclosure. The brushless motor may include less than or more than three phases of windings.

The impact screwdriver 100 includes a control circuit. The control circuit includes a driver circuit 171 and a controller 17. The driver circuit 171 is electrically connected to the stator windings A, B, and C of the electric motor 12 and configured to transmit a current from the DC power supply 30 to the stator windings A, B, and C so as to drive the electric motor 12 to rotate. In an example, the drive circuit 171 includes multiple switching elements Q1, Q2, Q3, Q4, Q5, and Q6. The gate terminal of each switching element is electrically connected to the controller 17 and used for receiving a control signal from the controller 17. The drain or source of each switching element is connected to the stator windings A, B, and C of the electric motor 12. The switching elements Q1 to Q6 receive control signals from the controller 17 to change respective conduction states, thereby changing the current loaded to the stator windings A, B, and C of the electric motor 12 by the DC power supply 30. In an example, the driver circuit 171 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches, such as the IGBTs or the BJTs.

In this example, the controller 17 is configured to control the electric motor 12. The controller 17 is disposed on a control circuit board, where the control circuit board includes a printed circuit board (PCB) and a flexible printed circuit (FPC) board. The controller 17 adopts a dedicated control chip, for example, a single-chip microcomputer or a microcontroller unit (MCU). Specifically, the controller 17 controls the on or off states of the switching elements in the driver circuit 171 through the control chip. In some examples, the controller 17 controls the ratio of on-time of a drive switch to off-time of the drive switch based on a pulse-width modulation (PWM) signal. It is to be noted that the control chip may be integrated in the controller 17 or may be disposed independently of the controller 17. The structural relationship between a drive chip and the controller 17 is not limited in this example.

The impact screwdriver 100 further includes a main switch 16 and a switching portion 163. The main switch 16 is disposed on the grip 113 for the user to operate. The main switch 16 is used for controlling the energization state of the electric motor 12. The switching portion 163 is disposed on the upper side of the main switch 16 and configured to be operated to set a rotation direction of the electric motor 12 to a forward rotation direction in which the fastener is fastened or screwed in or a reverse rotation direction in which the fastener is loosened or screwed out.

In this example, the main switch 16 is a trigger switch, where the trigger switch includes an operation member 161 to be operated and a slide rheostat 162. Therefore, the main switch 16 may also adjust the rotational speed of the electric motor 12. The rotational speed of the electric motor 12 is adjusted according to the trigger stroke of the operation member 161. The trigger stroke of the operation member 161 is different, and a signal outputted by the slide rheostat 162 is different. The trigger stroke of the operation member 161 is positively correlated with the duty cycle of the PWM signal of the electric motor 12, and the duty cycle of the PWM signal is positively correlated with the rotational speed of the electric motor 12. When the trigger stroke of the trigger switch is relatively short, the duty cycle of the PWM signal is also relatively low, and the rotational speed of the electric motor 12 is relatively low in this case.

In some examples, the mapping relationship between the trigger stroke of the operation member 161 and the PWM signal is stored in the impact screwdriver 100, where the mapping relationship may be linear or non-linear, which is not limited in the examples of the present application.

In a working process of the impact screwdriver 100, when the impact screwdriver 100 is unloaded, the impact mechanism 15 does not impact and acts as a transmission to transmit the rotation of the electric motor 12 to the output shaft 131. When a load is applied to the impact tool 100, the rotation of the output shaft 131 is blocked. The output shaft 131 may reduce a rotational speed or may completely stop rotating due to a different magnitude of the load. When the output shaft 131 completely stops rotating, the hammer anvil 153 also stops rotating. Due to the limiting action of the hammer anvil 153 on the impact block 152 in a circumferential direction, the impact block 152 also stops rotating. However, the main shaft 151 continues rotating such that a ball 155 is pressed to move along a ball track, thereby driving the impact block 152 to displace rearward along the axis of the main shaft. At the same time, the resilient element 154 is pressed until the hammer anvil 153 is completely separated from the impact block 152. In this case, the main shaft 151 drives the impact block 152 to rotate at a certain rotational speed, and the resilient element 154 rebounds along an axial direction. When the impact block 152 rotates to be in contact with the hammer anvil 153, the impact force is applied to the hammer anvil 153. Under the action of this impact force, the output shaft 131 overcomes the load and continues rotating by a certain angle, and then the output shaft 131 stops rotating again. The preceding process is repeated. Since an impact frequency is high enough, a relatively continuous impact force is generated to the output shaft so that the working accessory continues working.

In the examples of the present application, the electric motor 12 includes a running state and a shutdown state. When the electric motor 12 is in the running state, the electric motor 12 drives the output shaft to output the torque to rotate the fastener. Optionally, the running state may include, but is not limited to, the case where the electric motor 12 drives the impact mechanism 15 to output the impact force to the output shaft 13 or the case where the electric motor 12 drives the output shaft 10 to rotate at a uniform speed or with the reduction of the speed. When the electric motor 12 is in the shutdown state, the electric motor 12 cannot drive the output shaft to output the torque to rotate the fastener. Optionally, the shutdown state may include, but is not limited to, the case where the output shaft 13 rotates at a rotational speed of 0 or the case where the output shaft 13 rotates at a rotational speed other than 0 but the output shaft 13 with the rotational speed cannot drive the fastener to rotate.

In this example, the controller 17 is configured to: acquire a running parameter of the motor after the impact mechanism applies the impact force to the output shaft, determine the number of rotations of the output shaft or a change value of the number of rotations of the output shaft according to the running parameter of the motor in one or more impact cycles, determine that the fastener is in a fastening state, and control the motor to limit the torque output so that the output shaft cannot output the torque, that is, the controller controls the motor to enter the shutdown state.

When the duty cycle of a drive signal of the electric motor 12 is fixed, the heavier the load on the output shaft, the smaller the rotation angle of the output shaft caused by the impact force when impact occurs each time. In addition, the number of rotations of the drive shaft of the electric motor is related to the rotation angle of the output shaft. The number of commutation times of the electric motor is related to the number of rotations of the drive shaft of the electric motor. Therefore, a commutation parameter of the electric motor may represent a load parameter of the output shaft. Therefore, when the duty cycle of the drive signal of the electric motor 12 is fixed, the heavier the load on the output shaft, the smaller the number of commutation times of the electric motor in the process where the impact occurs.

In this example, the controller 17 is further configured to: after the impact mechanism applies the impact force to the output shaft, determine, according to a load parameter of the output shaft in the one or more impact cycles, that the fastener is in the fastening state and control the motor to enter the shutdown state, where the load parameter of the output shaft includes the number of commutation cycles of the motor and/or a change in the number of commutation cycles of the motor.

In the examples of the present application, the load parameter of the output shaft may be a parameter representing a change in the load to which the impact tool is subjected. The load on the impact tool is positively correlated with the degree of fastening between the fastener and the target workpiece. As the fastener is gradually tightened, the load on the impact tool gradually increases.

A commutation cycle of the electric motor may be represented by the cycle in which a current of the electric motor is commutated during the running of the electric motor 12. When the duty cycle of the drive signal of the electric motor 12 is fixed, the heavier the load on the output shaft, the smaller the number of commutation cycles of the electric motor between two impacts of the impact mechanism. Thus, the change in the load on the impact tool may be identified according to the commutation parameter of the electric motor in the one or more impact cycles.

Figure 6:
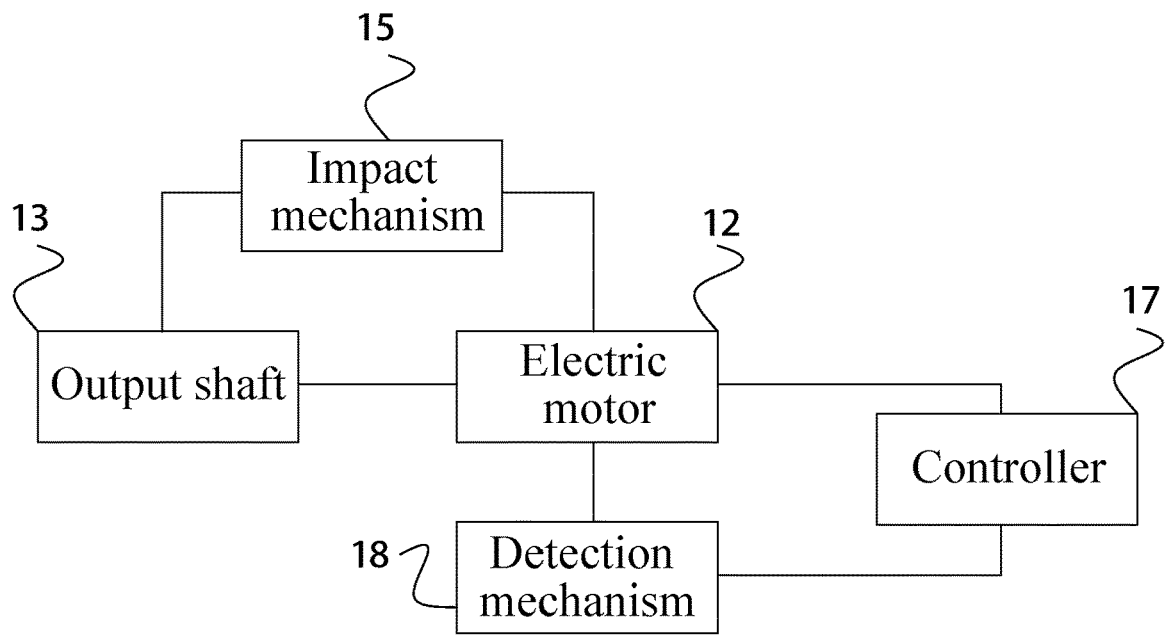
FIG. 6 is a structural diagram of a control device of an impact tool according to an example of the present application.

Referring to FIGS. 3 and 6, the impact screwdriver 100 further includes a detection mechanism 18 configured to detect the running parameter of the motor, that is, a running parameter of the electric motor. In this example, the detection mechanism 18 is connected to the electric motor 12 and the controller 17 separately.

The controller 17 is configured to determine an impact cycle, the number of commutation times of the motor, the number of commutation cycles of the motor, and a change in the number of commutation cycles of the motor according to the running parameter of the electric motor, where the number of commutation cycles of the motor may be obtained through the number of commutation times of the motor.

In this example, an impact cycle refers to the interval between two adjacent impacts. The heavier the load on the output shaft 13, the shorter the interval between the two impacts, that is, the shorter the impact cycle.

The commutation parameter of the electric motor includes the number of commutation cycles of the motor, the change in the number of commutation cycles of the motor, and the number of commutation times of the electric motor.

The running parameter of the electric motor 12 may include at least one of a current parameter of the electric motor, an induced voltage parameter, commutation time of the electric motor, and a rotational speed parameter of the electric motor. The current parameter of the electric motor includes the magnitude of the current of the electric motor and the direction of the current of the electric motor. The induced voltage parameter includes the magnitude of the induced voltage of at least one stator winding and the direction of the induced voltage of the at least one stator winding. The rotational speed parameter of the electric motor includes the magnitude of the rotational speed of the electric motor and the direction of the rotational speed of the electric motor.

The commutation time of the electric motor includes commutation time of at least one phase winding or a commutation interval of the at least one phase winding.

In some examples, running parameters of the electric motor 12, such as the current of the electric motor, the induced voltage, and the commutation time of the electric motor, are collected in real time by the detection mechanism 18 in the working process of the impact tool. The controller 17 may determine the impact cycle and the commutation parameter of the electric motor according to any one or any combination of the running parameters, such as the current of the electric motor, the induced voltage, and the commutation time of the electric motor. If the impact cycle between the two adjacent impacts is equal or approximately equal to the commutation parameter of the electric motor, the controller 17 identifies that the load is approximately constant. The electric motor 12 is controlled to run at an existing speed and output a uniform impact force. If the impact cycle between the two adjacent impacts becomes shorter gradually, the number of commutation cycles of the electric motor or the number of commutation times of the electric motor during the two impacts gradually decreases, or the rate of a change in the number of commutation cycles of the electric motor during the two impacts increases, the controller 17 identifies that the load gradually increases. In addition, according to the impact cycle and the commutation parameter of the electric motor, it is determined whether the fastener is completely screwed into the target workpiece. When the controller 17 determines that the fastener is completely screwed into the target workpiece, that is, the fastener is in the fastening state, the controller 17 controls the electric motor 12 to enter the shutdown state.

According to the technical solution of the present application, the change in the load on the output shaft of the impact tool is identified through the running parameter of the electric motor, the change in the load may be represented by the impact cycle and the commutation parameter of the electric motor, and the electric motor is controlled, according to the change in the load, to enter the shutdown state. The problems are solved that a fastening effect is poor and the workpiece is easily damaged due to the fact that a related impact tool is shut down according to identification through the user's hand feeling or identification through impact time, which is conducive to precisely controlling the fastening state and avoiding damage to the workpiece caused by poor fastening.

In this example, target workpieces may be two workpieces of the same material or different materials. Optionally, the target workpieces may be an iron sheet and a wooden board, two iron sheets, or two wooden boards.

In this example, the example is used in which the fastener is a screw and the target workpieces are the iron sheet and the wooden board. Under the working condition where the iron sheet and the wooden board are fastened with the screw, there are generally three stages. At the first stage, the screw pierces the iron sheet. Since the iron sheet is generally thin, in the process where the screw pierces the iron sheet, the load on the output shaft is light and the electric motor 12 drives the output shaft 13 to rotate at a high speed so as to drive the screw to pierce the iron sheet. At this stage, the impact tool does not impact. The second stage is entered after the screw pierces the iron sheet. At the second stage, in the process where the screw is screwed into the wooden board, resistance applied by the wooden board to the screw is increased, and the screw is subjected to certain resistance in this case. Thus, the load on the output shaft is increased, and the rotation of the output shaft 131 is blocked. When the output shaft 131 completely stops rotating, the impact mechanism 15 applies the impact force to the output shaft 13. When the impact mechanism 15 is driven by the electric motor 12 to provide the impact force for the output shaft 13, the screw can be continuously screwed in. At the third stage, the screw is completely screwed in, that is, the fastener is in the fastening state. The head of the screw should be flush or approximately flush with the surface of the iron sheet when the fastener is in the fastening state. Therefore, the electric motor needs to be controlled to shut down in time.

When the impact tool enters an impact state, the electric motor 12 drives the impact mechanism 15 to impact, the resilient element 154 in the impact mechanism 15 is compressed and rebounds cyclically, the impact block reciprocates cyclically while rotating, and components in the impact mechanism move cyclically so that the current direction of a stator winding of the electric motor 12 is caused to alternate cyclically. When the resilient element 154 is at the maximum compression point, the current of the electric motor is at a peak position. The time between two adjacent peak positions is the interval between the two adjacent impacts, that is, the impact cycle. In one impact cycle, the number of commutation cycles of the electric motor and the change in the number of commutation cycles of the electric motor may be counted based on the running parameter of the electric motor or may be determined through lookup.

Determining the load parameter of the output shaft of the impact tool according to the running parameter includes the following steps: a change trend of the running parameter is identified according to the running parameter of the electric motor 12; and the impact cycle and the number of commutation cycles of the electric motor in the one impact cycle are determined according to the change trend of the running parameter. Controlling the electric motor 12 to enter the shutdown state according to the load parameter includes the following steps: it is determined, according to the number of commutation cycles of the electric motor and the change in the number of commutation cycles of the electric motor in the impact cycle, whether the fastening is completed; and when it is determined that the fastening is completed, the electric motor 12 is controlled to enter the shutdown state.

The change trend of the running parameter may be represented by a waveform curve of the running parameter including, but not limited to, a waveform curve of the current of the electric motor and a commutation waveform curve. The waveform curve of the current of the electric motor may be established according to collected currents of the electric motor of any phase winding. The commutation waveform curve may be established according to collected induced voltages of any phase winding.

Figure 4A:
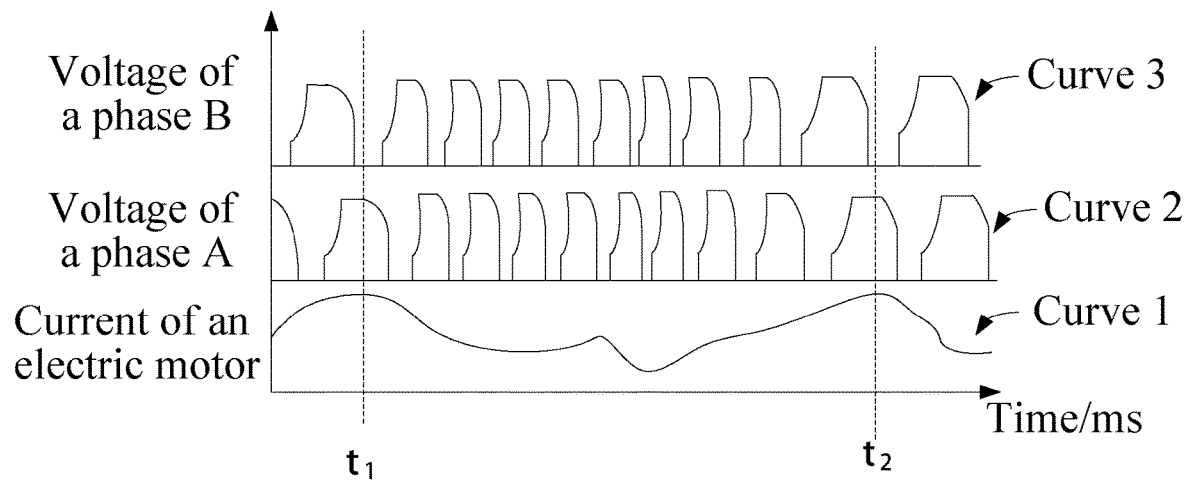
FIG. 4a is a schematic diagram showing waveform curves of running parameters of an electric motor in a first sampling cycle according to an example of the present application.
Figure 4B:
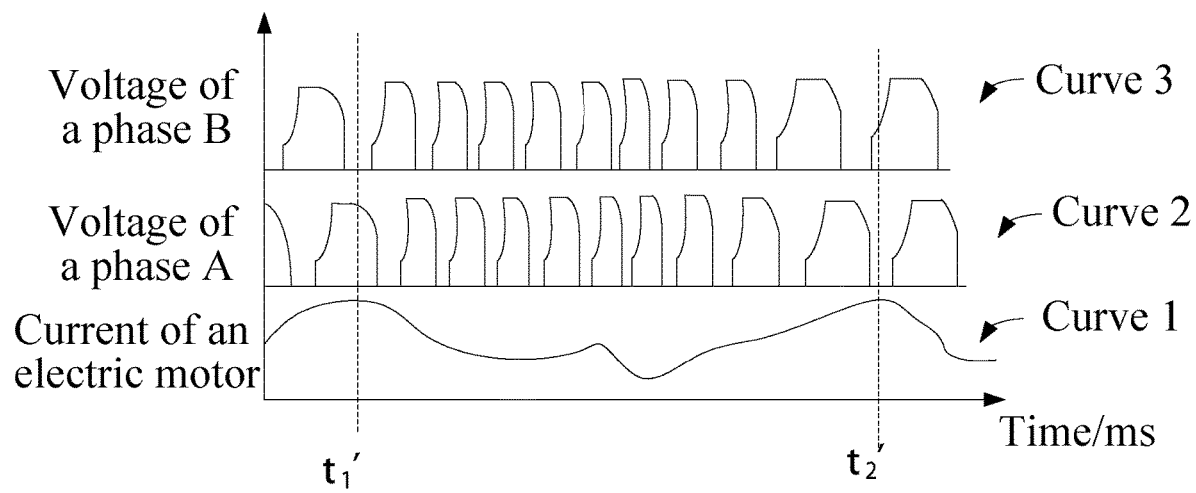
FIG. 4b is a schematic diagram showing waveform curves of running parameters of an electric motor in a second sampling cycle according to an example of the present application.

FIGS. 4a and 4b are schematic diagrams showing waveform curves of the running parameters of the electric motor according to an example of the present application. Curve 1 is the waveform curve of the current of the electric motor, and curve 2 and curve 3 are commutation waveform curves of two of the three phases of the electric motor. FIG. 4a shows waveform curves of a first sampling cycle, and FIG. 4b shows waveform curves of a second sampling cycle, where the second sampling cycle is later than the first sampling cycle.

As shown in FIG. 4a, curve 1 is the waveform curve of the current of the electric motor in the first sampling cycle, curve 2 is the commutation waveform curve of a voltage of a phase a in the first sampling cycle, and curve 3 is the commutation waveform curve of a voltage of a phase b in the first sampling cycle.

As shown in FIG. 4b, curve 1 is the waveform curve of the current of the electric motor in the second sampling cycle, curve 2 is the commutation waveform curve of the voltage of the phase a in the second sampling cycle, and curve 3 is the commutation waveform curve of the voltage of the phase b in the second sampling cycle.

Referring to curves 1 shown in FIGS. 4a and 4b, when the impact tool enters the impact state, that is, it is determined that the impact mechanism 15 starts to apply the impact force to the output shaft 13, the resilient element 154 in the impact tool is compressed and rebounds cyclically. At peak positions of the current of the electric motor (the moment $t_1$ and the moment $t_2$ or the moment $t_1'$ and the moment $t_2'$), the resilient element 54 is compressed to the maximum compression point, the main shaft 5 drives the impact block 5 to rotate at a certain rotational speed, and the resilient element 54 rebounds along the axial direction. When the impact block 152 rotates to be in contact with the hammer anvil 153, the impact force is applied to the hammer anvil 153. Therefore, the time between the two adjacent peak positions of the current of the electric motor (the moment $t_1$ and the moment $t_2$ or the moment $t_1'$ and the moment $t_2'$) is the interval between the two adjacent impacts, representing one impact cycle.

With continued reference to FIGS. 4a and 4b, impact cycles in different sampling cycles, the number of commutation cycles of the electric motor corresponding to the impact cycles, and the change in number of commutation cycles of the electric motor may be determined through the lookup (with an oscilloscope) according to data recorded by curves 1, 2 and 3 in the different sampling cycles. For example, in FIG. 4a, the interval between the moment $t_1$ and the moment $t_2$ (that is, an impact cycle in the first sampling cycle) may be 74.9 ms, and the number of commutation cycles of the electric motor between the moment $t_1$ and the moment $t_2$ may be 9. In FIG. 4b, the interval between the moment $t_1'$ and the moment $t_2'$ (that is, an impact cycle in the second sampling cycle) may be 73.2 ms, and the number of commutation cycles of the electric motor between the moment $t_1'$ and the moment $t_2'$ may be 9 minus 2/6, that is $N=9-2/6$.

In this example, in the process where the fastening member is screwed into the target piece, the impact tool continuously impacts under a uniform load, and during the two adjacent impacts, impact forces applied by the impact mechanism 15 to the output shaft is equal or approximately equal to each other, or impact angles by which the output shaft is rotated through all impact forces are equal or approximately equal to each other. In addition, impact cycles and commutation parameters of the electric motor are equal or approximately equal to each other. As the fastener is gradually tightened, the load on the impact tool gradually increases, the rotation angle of the drive output shaft of the impact mechanism 15 gradually becomes smaller, and the impact cycle and the commutation parameter of the electric motor are changed.

When the duty cycle of the drive signal of the electric motor 12 is fixed, if the number of commutation cycles of the electric motor is small in the one impact cycle, it may be represented that the rotation angle of the output shaft 13 is small in the one impact cycle. Thus, it is indicated that the angle is small by which the anvil, the output shaft, or the bit is rotated and moved due to the impact force applied by the impact block. Therefore, it may be determined that the load on the output shaft of the impact tool is heavy. If there is a big change in the number of commutation cycles of the electric motor in adjacent impact cycles, it may be determined that a big change in the load on the output shaft of the impact tool occurs. In this example, when the workpiece is completely screwed into the target workpiece, the output shaft 131 is blocked or the rotation angle of the input shaft 13 becomes smaller, that is, the load on the output shaft 13 becomes heavier. The impact cycle of the output shaft 13 under a blocked working condition, the number of commutation cycles of the electric motor corresponding to the impact cycle, and the change in the number of commutation cycles of the electric motor are precalibrated, and determination is performed based on detected data and the precalibrated data so that it may be identified whether the fastener is completely screwed into the target workpiece, that is, whether the fastener is in the fastening state. If the number of commutation cycles of the electric motor or the change in the number of commutation cycles of the electric motor reaches the calibrated data under the blocked working condition, it may be determined that the fastener is in the fastening state, and the electric motor 12 is controlled to shut down.

In the examples of the present application, the running parameter of the electric motor 12 is detected, the waveform curve of the running parameter is established, and the load parameter of the impact tool may be determined through the lookup and calculation so that the fastening state between the fastener and the target workpiece is automatically identified. The controller automatically controls the electric motor to shut down. The control strategy is intuitive and simple, which is conducive to avoiding damage to the fastener and the target workpiece.

Before the third stage, the fastener, that is, the screw, is in face contact with the target workpiece. The screw is used as an example, and the bottom surface of a screw head is brought into contact with the surface of the iron sheet, and then the top surface of the screw head is flush with the surface of the iron sheet. As an example of the present application, the application scenario is provided where the contact surface between the fastener driven by the impact tool and the target workpiece is a plane with an abrupt dimensional change, that is, the bottom surface of the screw head is a plane, and the load increases abruptly when the fastener is in the fastening state. The controller is configured to: acquire the number of commutation cycles of the electric motor in a single impact cycle or multiple impact cycles, perform determination based on the number of commutation cycles of the electric motor and a preset threshold of the number of commutation cycles of the electric motor to determine that the fastener is in the fastening state, and control the motor to enter the shutdown state, where the preset threshold of the number of commutation cycles of the electric motor is denoted by a first preset threshold.

The first preset threshold is greater than or equal to the maximum value of the number of commutation cycles of the electric motor in the single impact cycle when the output shaft 13 is in the blocked mode. When the output shaft 13 is in the blocked mode, the maximum value of the number of commutation cycles of the electric motor in the single impact cycle is related to the reduction ratio of a gearbox. The specific value thereof is not limited.

In the process where the impact tool is developed or manufactured or before the impact tool is used by the user, parameters under the condition where the fastener is completely screwed into the target workpiece are tested and calibrated. Under the working condition where the output shaft 13 is blocked, as the spring is compressed and rebounds, the impact block rotates and reciprocates to output the impact force, and the current of the electric motor cyclically changes. If a conversion cycle of the current of the electric motor is determined, through tests, as that N=(8+5/6)=8.83, the first preset threshold may be set to any value greater than or equal to 8.83, for example, the first preset threshold may be set as that N=9.

In this example, in the working process of the impact tool, the controller is configured to: acquire the number of commutation cycles of the electric motor in the single impact cycle or the multiple impact cycles, perform determination based on the number of commutation cycles of the electric motor and the first preset threshold to determine that the fastener is in the fastening state, and control the motor to enter the shutdown state. The impact cycle and the number of commutation cycles of the electric motor corresponding to the impact cycle under the blocked working condition are calibrated so that it is determined that the fastener is in the fastening state. The user does not need to determine, according to the hand feeling, whether the workpiece is tightened, and the damage to the fastener and the target workpiece is avoided.

As an example of the present application, the impact tool is used in the application scenario where the contact surface between the fastener and the target workpiece is a gradually changing surface (such as an inclined plane), that is, the bottom surface of the screw head is the inclined plane, and the load increases gradually when the fastener is in the fastening state. The controller is configured to: acquire a change in the number of commutation cycles of the electric motor in two or more adjacent impact cycles, perform determination based on the change in the number of commutation cycles of the electric motor and a preset threshold of the change in the number of commutation cycles of the electric motor to determine that the fastener is in the fastening state, and control the motor to enter the shutdown state, where the preset threshold of the change in the number of commutation cycles of the electric motor is denoted by a second preset threshold.

Optionally, the second preset threshold may be a change in the number of commutation cycles of the electric motor in the two adjacent impact cycles when the fastener is completely screwed into the target member and the output shaft 13 rotates in the mode where the angle becomes smaller. A change value of the number of commutation cycles of the electric motor is calculated from the maximum value of the number of commutation cycles of the electric motor in the two adjacent impact cycles as described in the preceding example, which is not limited herein.

In the process where the impact tool is developed or manufactured or before the impact tool is used by the user, the parameters under the condition where the fastener is completely screwed into the target workpiece are tested and calibrated. When the fastener is completely screwed into the target member, that is, the fastener is in the fastening state, the rotation angle of the output shaft 13 is small, that is, the load on the output shaft is heavy. The number of commutation cycles of the electric motor in the two or more adjacent impact cycles is tested, and the change in the number of commutation cycles of the electric motor in the two or more adjacent impact cycles is calculated.

In this example, in the working process of the impact tool, the number of commutation cycles of the electric motor in the multiple impact cycles is collected in real time, and the change in the number of commutation cycles of the electric motor in the two or more adjacent impact cycles is acquired. Determination is performed based on the change in the number of commutation cycles of the electric motor and the second preset threshold. If the change in the number of commutation cycles of the electric motor is equal or approximately equal to the second preset threshold, it may be determined that the fastener is completely screwed into the target workpiece and is in the fastening state. The electric motor 12 is controlled to shut down. The impact cycle and the number of commutation cycles of the electric motor corresponding to the impact cycle under the blocked working condition are calibrated so that it may be identified whether the fastener is completely screwed into the target workpiece. The user does not need to determine, according to the hand feeling, whether the workpiece is tightened, and the damage to the fastener and the target workpiece is avoided.

When the impact tool is used in the application scenario where there are multiple kinds of fasteners and target workpieces, the controller is configured to: acquire the number of commutation cycles of the motor in the single impact cycle and the change in the number of commutation cycles of the motor in the two or more adjacent impact cycles, perform determination based on the number of commutation cycles of the motor and a preset threshold of the number of commutation cycles of the motor and perform determination based on the change in the number of commutation cycles of the motor and a preset threshold of the change in the number of commutation cycles of the motor to determine that the fastener is in the fastening state, and control the motor to enter the shutdown state.

According to the technical solution in the example of the present application, the impact tool is adaptable to various working conditions. The impact cycle and the number of commutation cycles of the electric motor corresponding to the impact cycle under the blocked working condition are calibrated so that it may be identified whether the fastener is completely screwed into the target workpiece. The user does not need to determine, according to the hand feeling, whether the workpiece is tightened, and the damage to the fastener and the target workpiece is avoided.

Figure 5:
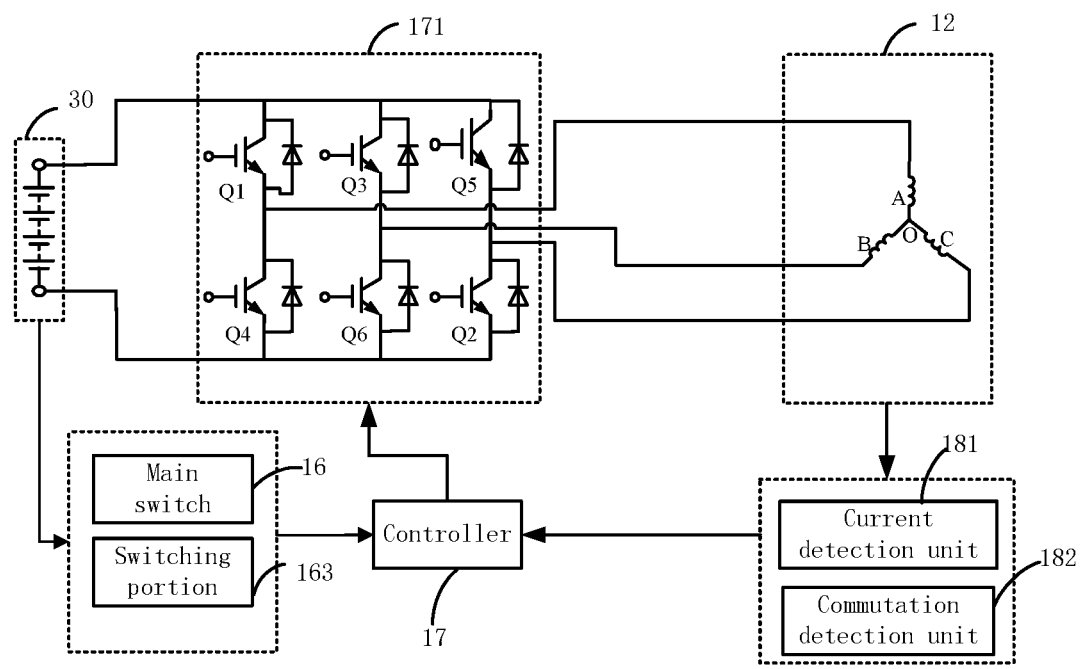
FIG. 5 is a circuit block diagram of another impact tool according to an example of the present application.

Optionally, FIG. 5 is a structural diagram of the detection mechanism 18 of an impact tool according to an example of the present application. The impact tool provides an optional solution for the specific composition of the detection mechanism 18 based on the preceding example.

As shown in FIG. 5, the detection mechanism 18 includes at least a current detection unit 181 and a commutation detection unit 182. The current detection unit 181 is configured to detect the current parameter of the electric motor. The current detection unit 181 includes, but is not limited to, a current sensor, a current sensing resistor, or a mosfet on-resistor. The commutation detection unit 182 is configured to perform commutation detection on the electric motor 12 to obtain the number of commutation times and/or the commutation time of each commutation. The commutation detection unit 182 may perform the commutation detection on the electric motor 12 in a sensorless detection manner and/or in a sensored detection manner.

In this example, the commutation detection includes the sensored detection manner with which the position of the rotor is detected. The sensored detection manner refers to that a Hall sensor is used as the commutation detection unit and the position of the rotor of the electric motor 12 is detected by the Hall sensor. During rotation, the electric motor 12 needs to switch a conductive phase continuously. For example, the six-step commutation method (the commutation steps of three phases A, B, and C of the electric motor are AB→AC→BC→CA→CB→BA, through which the electric motor rotates by 360° electronically) may be used. Therefore, only the total number of commutation steps of the electric motor in each impact cycle needs to be recorded, and the ratio of the total number of commutation steps to 6 times the number of pole pairs of the electric motor is the actual number of rotations of the electric motor.

The controller 17 is configured to determine the impact cycle according to the time between peaks of the current of the motor. The impact cycle is determined according to time taken for each commutation of the motor. The controller 17 is configured to determine the commutation parameter of the electric motor according to the number of commutation times and the impact cycle.

In this example, the controller 17 may also determine the impact cycle according to the current parameter, which is not limited. The controller 17 may also determine the impact cycle by acquiring the commutation time of the electric motor 12 and the rotational speed of the electric motor according to actual requirements. The controller 17 determines the commutation parameter of the electric motor, where the commutation parameter may include, but is not limited to, the number of commutation cycles of the electric motor and the change in the number of commutation cycles of the electric motor in the single impact cycle or the multiple impact cycles. The controller 17 controls, according to the load parameter, the electric motor 12 to shut down.

Figure 7:
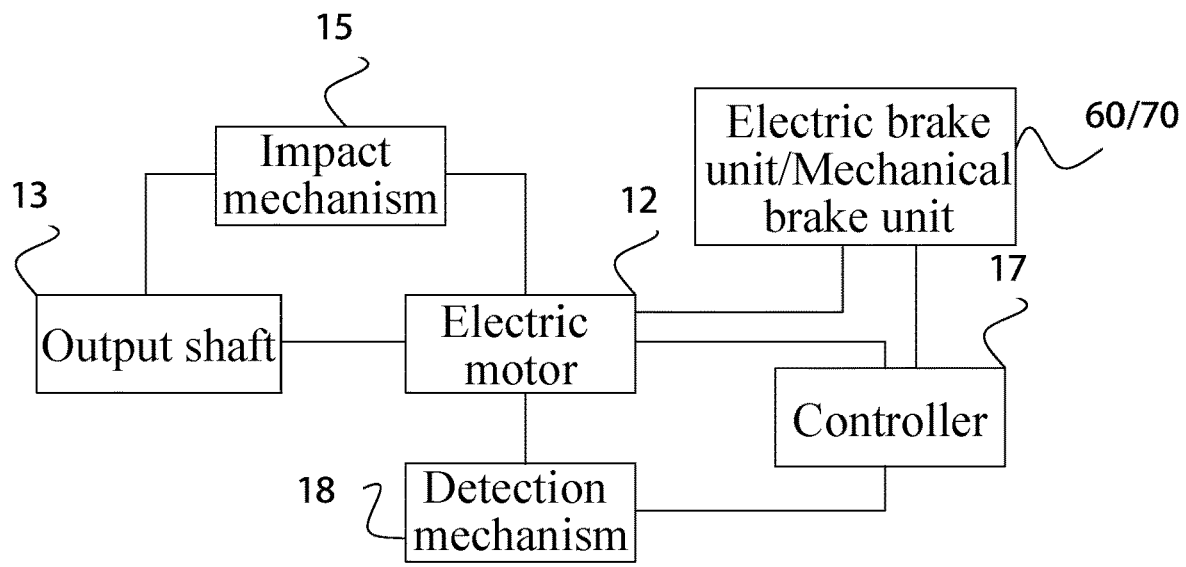
FIG. 7 is a structural diagram of a control device of another impact tool according to an example of the present application.

FIG. 7 is a structural diagram of another impact tool according to an example of the present application. As shown in FIG. 7, the impact tool further includes an electric brake unit 60 and/or a mechanical brake unit 70 based on the preceding example. When the electric motor 12 is controlled to enter the shutdown state and when it is determined that the fastener is in the fastening state, the controller 17 is configured to: control the electric brake unit 60 to electrically brake the electric motor 12; and/or control the mechanical brake unit 70 to mechanically brake the electric motor 12.

Figure 8:
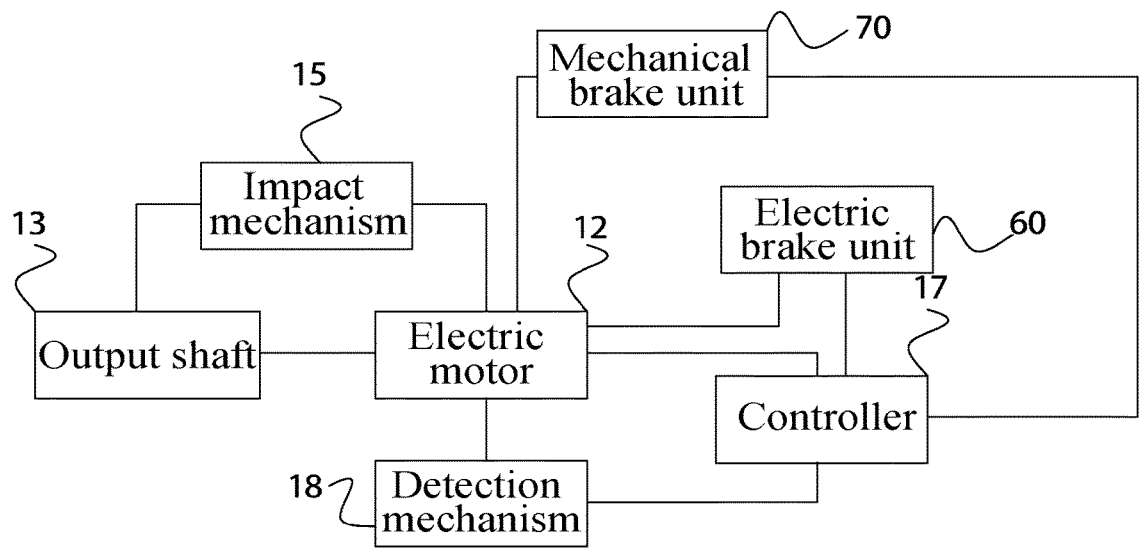
FIG. 8 is another structural diagram of the example of FIG. 7.

As shown in FIG. 8, the electric brake unit 60 electrically brakes the electric motor 12, which may include, but is not limited to, the deenergization of the electric motor 12. Thus, the electric motor 12 cannot drive the output shaft 13 and the impact mechanism 15 so that the fastener is prevented from being continuously screwed into the target workpiece and damaging the target workpiece. The mechanical brake unit 70 mechanically brakes the electric motor 12, which may include, but is not limited to, the application of a brake measure to the electric motor 12. Thus, the electric motor 12 is shut down.

According to the technical solution of the present application, an optional solution for controlling the electric motor to enter the shutdown state is provided, and it is ensured that it is determined, in the working process of the impact tool, that the fastener is completely screwed in, and the electric motor can be controlled to shut down, thereby avoiding the damage to the workpiece and the target workpiece.

Figure 9:
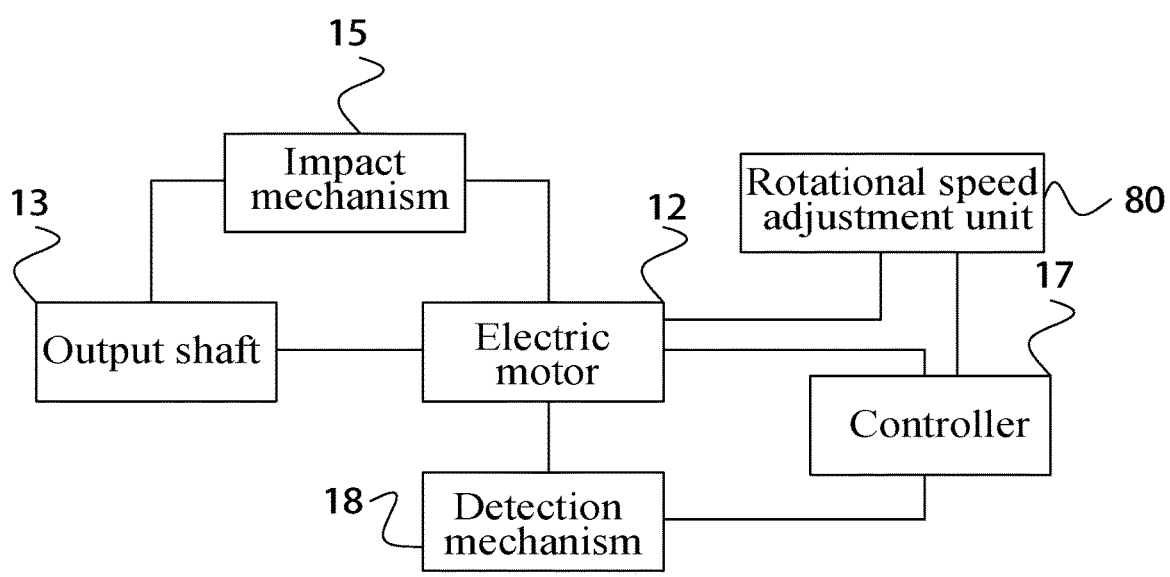
FIG. 9 is a schematic diagram of another control device of an impact tool according to an example of the present application.

Based on the preceding example, the present application further provides an impact tool. FIG. 9 is a structural diagram of another impact tool according to an example of the present application. As shown in FIG. 9, the impact tool further includes a rotational speed adjustment unit 80. When the electric motor 12 is controlled to enter the shutdown state, the controller 17 is configured to: adjust a target duty cycle of the rotational speed adjustment unit 80 according to the load parameter so that the rotational speed adjustment unit 80 drives, according to the target duty cycle, the electric motor 12 to run with the reduction of the speed. The target duty cycle may be set according to an actual parameter of the electric motor 12, which is not limited herein.

In the working process of the impact tool, the target duty cycle of the rotational speed adjustment unit 80 is adjusted according to the load parameter so that the rotational speed adjustment unit 80 drives, according to the target duty cycle, the electric motor 12 to run with the reduction of the speed. Thus, it is ensured that a cross bit externally connected to the output shaft 131 does not slip so that the workpiece is vertically screwed in, and it is ensured that the end cap of the fastener is flush with the target workpiece, thereby avoiding the damage to the fastener and the target workpiece.

According to the technical solution of the present application, based on the technical solution of the preceding example, the electric motor is driven, according to the load parameter of the impact tool, to reduce the speed so that the user reduces the speed of the electric motor with no necessity to determine the fastening degree of the working piece according to the hand feeling.

Figure 10:
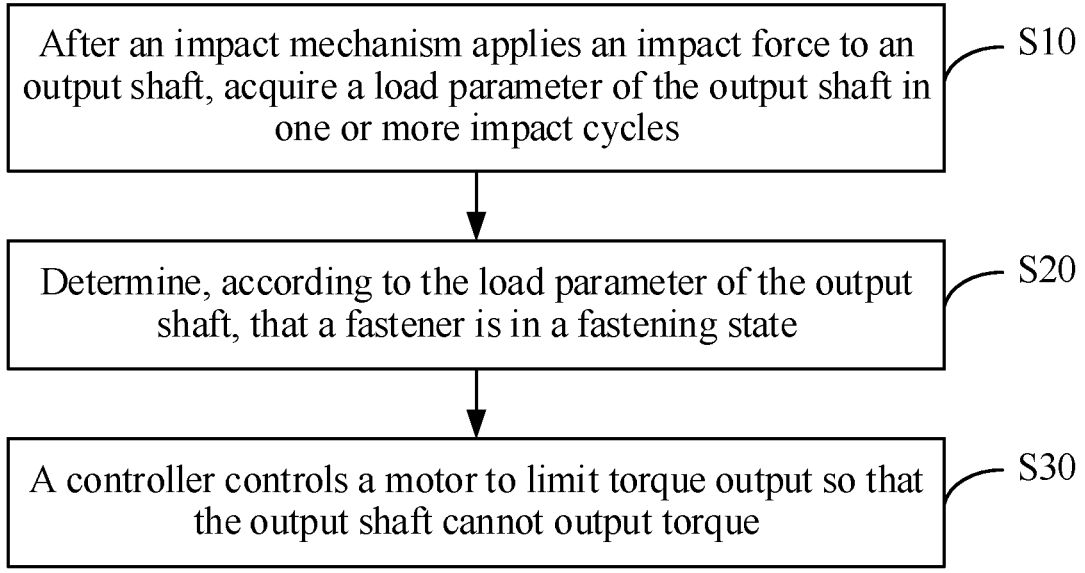
FIG. 10 is a flowchart of an impact tool control method according to an example of the present application.

An example of the present application further provides an impact tool control method. This example is applicable to the case where the impact tool is controlled to shut down and/or reduce a speed. The method may be performed by the impact tool provided by the example of the present application, and the impact tool may be implemented in the form of hardware and/or software. FIG. 10 is a flowchart of the impact tool control method according to the example of the present application. As shown in FIG. 10, the method includes the steps described below.

In S10, after an impact mechanism applies an impact force to an output shaft, a load parameter of the output shaft in one or more impact cycles is acquired. The load parameter of the output shaft includes the number of commutation cycles of a motor and/or a change in the number of commutation cycles of the motor.

Running parameters of the impact tool, such as the current of an electric motor, an induced voltage, and commutation time of the electric motor, are collected in real time in a working process of the impact tool. Further, an impact cycle and a commutation parameter of the electric motor may be determined according to any one or any combination of the running parameters, such as the current of the electric motor, the induced voltage, and the commutation time of the electric motor. The commutation parameter of the electric motor includes the number of commutation cycles of the electric motor and/or a change in the number of commutation cycles of the electric motor. When the duty cycle of a drive signal of the electric motor is fixed, the heavier the load on the impact tool, the smaller the number of commutation cycles of the electric motor between two impacts.

In S20, according to the load parameter of the output shaft, it is determined that a fastener is in a fastening state.

After the running parameters of the electric motor are converted into the impact cycle and the commutation parameter of the electric motor, the change in the load on the impact tool may be identified according to the impact cycle and the commutation parameter of the electric motor.

In S30, the controller controls the motor to limit torque output so that the output shaft cannot output torque.

Controlling, according to the load parameter, the electric motor to enter a shutdown state may include, but is not limited to, electrically braking the electric motor and/or mechanically braking the electric motor, or driving, with a target duty cycle, the electric motor to reduce a speed and further controlling the electric motor to shut down.

As an example, the impact tool control method includes the steps described below.

The number of commutation cycles of the motor in a single impact cycle or multiple impact cycles is acquired after the impact mechanism applies the impact force to the output shaft; and according to the number of commutation cycles of the motor, it is determined that the fastener is in the fastening state, and the controller controls the motor to limit the torque output so that the output shaft cannot output the torque.

In other alternative examples, the impact tool control method includes the steps described below.

A change in the number of commutation cycles of the motor in two or more adjacent impact cycles is acquired after the impact mechanism applies the impact force to the output shaft; and according to the change in the number of commutation cycles of the motor, it is determined that the fastener is in the fastening state, and the controller controls the motor to limit the torque output so that the output shaft cannot output the torque.

In other alternative examples, controlling, according to the load parameter, the electric motor to enter the shutdown state includes the following steps: the number of commutation cycles of the electric motor in the single impact cycle and a change in the number of commutation cycles of the electric motor in the two adjacent impact cycles are acquired after the impact mechanism applies the impact force to the output shaft; determination is performed based on the number of commutation cycles of the electric motor and a first preset threshold and determination is performed based on the change in the number of commutation cycles of the electric motor and a second preset threshold such that it is determined the fastener is in the fastening state, and the controller controls the motor to limit the torque output so that the output shaft cannot output the torque.

It is to be understood that various forms of the preceding flows may be used with steps reordered, added, or removed. For example, the steps described in the present application may be executed in parallel, in sequence or in a different order as long as the desired results of the technical solutions of the present application are achieved. The execution sequence of these steps is not limited herein.

What is claimed is:

1. An impact tool, comprising:
   a motor comprising a drive shaft rotating about a first axis;
   an output shaft for outputting torque so that a fastener is operated, wherein the output shaft rotates with an output axis as a rotation axis;
   an impact mechanism for applying an impact force to the output shaft;
   a detection mechanism configured to detect a running parameter of the motor, and
   a controller configured to control the motor;
   wherein the controller is configured to:
      after the impact mechanism applies the impact force to the output shaft, determine, according to a load parameter of the output shaft in one or more impact cycles, that the fastener is in a fastening state and control the motor to limit torque output so that the output shaft is incapable of outputting the torque;
   wherein the load parameter of the output shaft comprises at least one of a number of commutation cycles of the motor or a change in the number of commutation cycles of the motor, and
   wherein the controller determines an impact cycle, the number of commutation cycles of the motor, and the change in the number of commutation cycles of the motor according to the running parameter of the motor.

2. The impact tool according to claim 1, wherein the controller is configured to determine the impact cycle according to time between peaks of a current of the motor.

3. The impact tool according to claim 1, wherein the controller is configured to determine the impact cycle according to time taken for each commutation of the motor.

4. The impact tool according to claim 1, wherein the controller is configured to:
   acquire the number of commutation cycles of the motor in a single impact cycle or a plurality of impact cycles; and
   after performing determination through comparison of the number of commutation cycles of the motor with a first preset threshold to determine that the fastener is in the fastening state, control the motor to limit the torque output so that the output shaft is incapable of outputting the torque.

5. The impact tool according to claim 4, wherein the first preset threshold is greater than or equal to a maximum value of the number of commutation cycles of the motor in the single impact cycle when the output shaft is in a blocked mode.

6. The impact tool according to claim 1, wherein the controller is configured to:
   acquire a change in the number of commutation cycles of the motor in two or more adjacent impact cycles; and
   after performing determination through comparison of the change in the number of commutation cycles of the motor with a second preset threshold to determine that the fastener is in the fastening state, control the motor to limit the torque output so that the output shaft is incapable of outputting the torque.

7. The impact tool according to claim 1, wherein the controller is configured to:
   acquire the number of commutation cycles of the motor in a single impact cycle and a change in the number of commutation cycles of the motor in two or more adjacent impact cycles; and
   after performing determination through comparison of the number of commutation cycles of the motor with a first preset threshold and performing determination through comparison of the change in the number of commutation cycles of the motor with a second preset threshold to determine that the fastener is in the fastening state, control the motor to limit the torque output so that the output shaft is incapable of outputting the torque.

8. The impact tool according to claim 1, further comprising:
   an electric brake unit;

wherein the controller is configured to: when the motor is controlled to enter a shutdown state and when the controller determines that the fastener is in the fastening state, control the electric brake unit to electrically brake the motor.

9. The impact tool according to claim 1, further comprising:
a mechanical brake unit;
wherein the controller is configured to: when the motor is controlled to enter a shutdown state and when the controller determines that the fastener is in the fastening state, control the mechanical brake unit to mechanically brake the motor.

10. The impact tool according to claim 1, wherein the controller is further configured to reduce a rotational speed of the motor after the impact mechanism applies the impact force to the output shaft.

11. The impact tool according to claim 1, further comprising a direct current (DC) power supply for powering the motor.

12. The impact tool according to claim 1, wherein the detection mechanism comprises a commutation detection unit configured to perform commutation detection on the motor to obtain at least one of a number of times a current of the motor is commutated or time during which the current is commutated each time.

13. An impact tool, comprising:
a motor comprising a drive shaft rotating about a first axis;
an output shaft for outputting torque so that a fastener is operated, wherein the output shaft rotates with an output axis as a rotation axis;
an impact mechanism for applying an impact force to the output shaft;
a detection mechanism configured to detect a running parameter of the motor, and
a controller configured to control the motor;
wherein the controller is configured to:
after the impact mechanism applies the impact force to the output shaft, determine, according to a load parameter of the output shaft in one or more impact cycles, that the fastener is in a fastening state and control the motor to limit torque output so that the output shaft is incapable of outputting the torque,
wherein the load parameter of the output shaft comprises at least one of a number of commutation cycles of the motor or a change in the number of commutation cycles of the motor, and
wherein the controller is configured to determine an impact cycle according to time between peaks of a current of the motor.

14. An impact tool, comprising:
a motor comprising a drive shaft rotating about a first axis;
an output shaft for outputting torque externally so that a fastener is operated, wherein the output shaft rotates with an output axis as a rotation axis;
an impact mechanism for applying an impact force to the output shaft; and
a controller configured to control the motor;
wherein the controller is configured to:
acquire a running parameter of the motor, determine a rotation angle of the output shaft or a change value of the rotation angle of the output shaft according to the running parameter of the motor in one or more impact cycles, determine that the fastener is in a fastening state, and control the motor to limit torque output so that the output shaft is incapable of outputting the torque, and
wherein the rotation angle of the output shaft is determined according to a number of commutation cycles of the motor between peaks of a working current of the motor.

15. An impact tool control method for controlling an impact tool, wherein the impact tool comprises:
a motor comprising a drive shaft rotating about a first axis;
an output shaft for outputting torque externally so that a fastener is operated, wherein the output shaft rotates with an output axis as a rotation axis;
an impact mechanism for applying an impact force to the output shaft;
a detection mechanism configured to detect a running parameter of the motor, and
a controller configured to control the motor, and
wherein the impact tool control method comprises:
acquiring a number of commutation cycles of the motor in a single impact cycle or a plurality of impact cycles after the impact mechanism applies the impact force to the output shaft; and
when the controller determines, according to the number of commutation cycles of the motor, that the fastener is in a fastening state, controlling, by the controller, the motor to limit a torque output so that the output shaft is incapable of outputting the torque.

16. The impact tool control method according to claim 15, comprising:
acquiring a change in the number of commutation cycles of the motor in two or more adjacent impact cycles after the impact mechanism applies the impact force to the output shaft; and
when the controller determines, according to the change in the number of commutation cycles of the motor, that the fastener is in the fastening state, controlling the motor to limit the torque output so that the output shaft is incapable of outputting the torque.

17. The impact tool according to claim 1, wherein the detection mechanism comprises a current detection unit configured to detect a current parameter of the motor.

* * * * *